Figure 1:
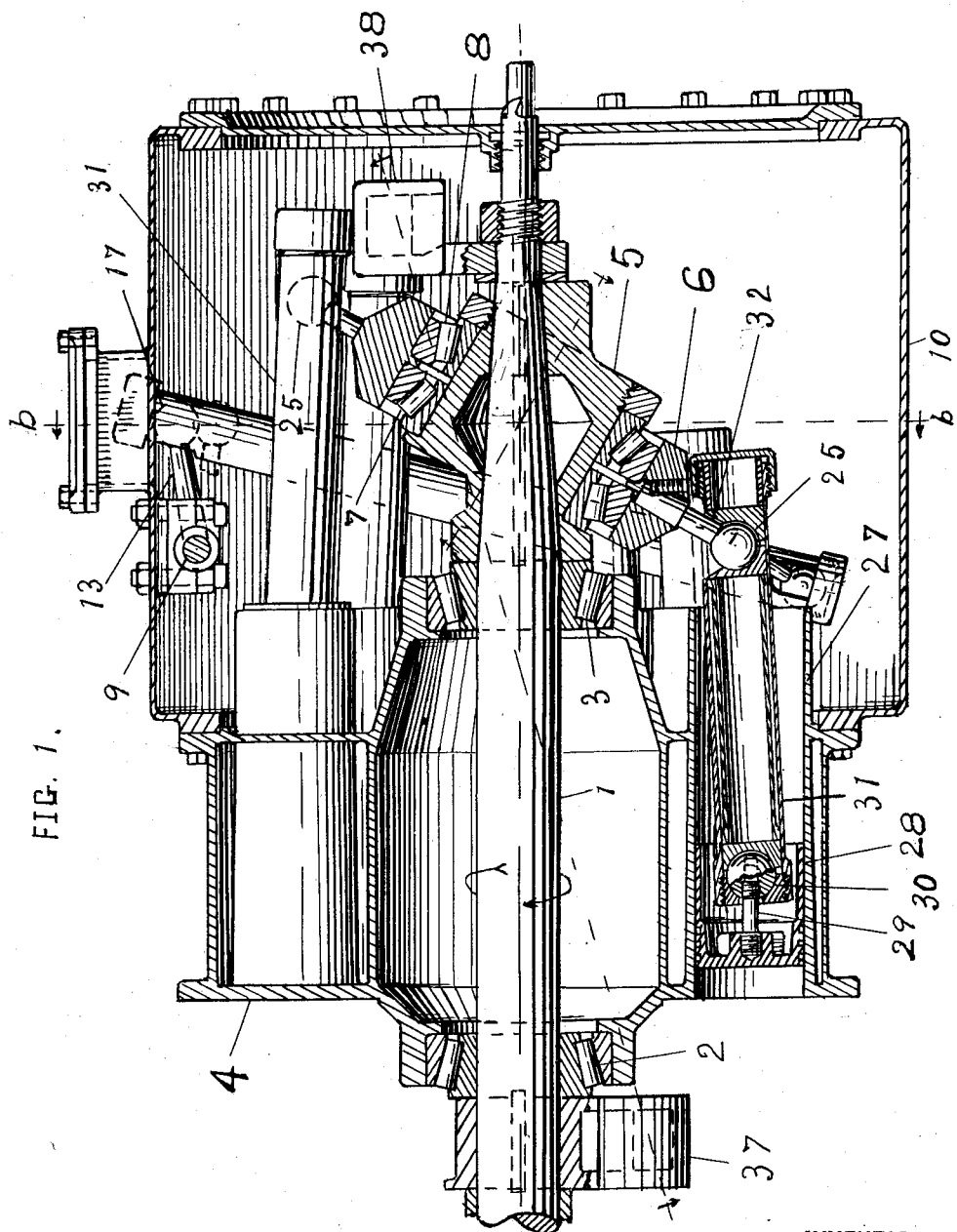

July 28, 1931.    M. A. YEAKLEY    1,816,274
WABBLER HOLDING MECHANISM
Original Filed Oct. 3, 1929    2 Sheets-Sheet 1

WITNESS  
INVENTOR.  
Melvin Albert Yeakley  
BY  
ATTORNEYS.

July 28, 1931.  M. A. YEAKLEY  1,816,274
WABBLER HOLDING MECHANISM
Original Filed Oct. 3, 1929  2 Sheets-Sheet 2
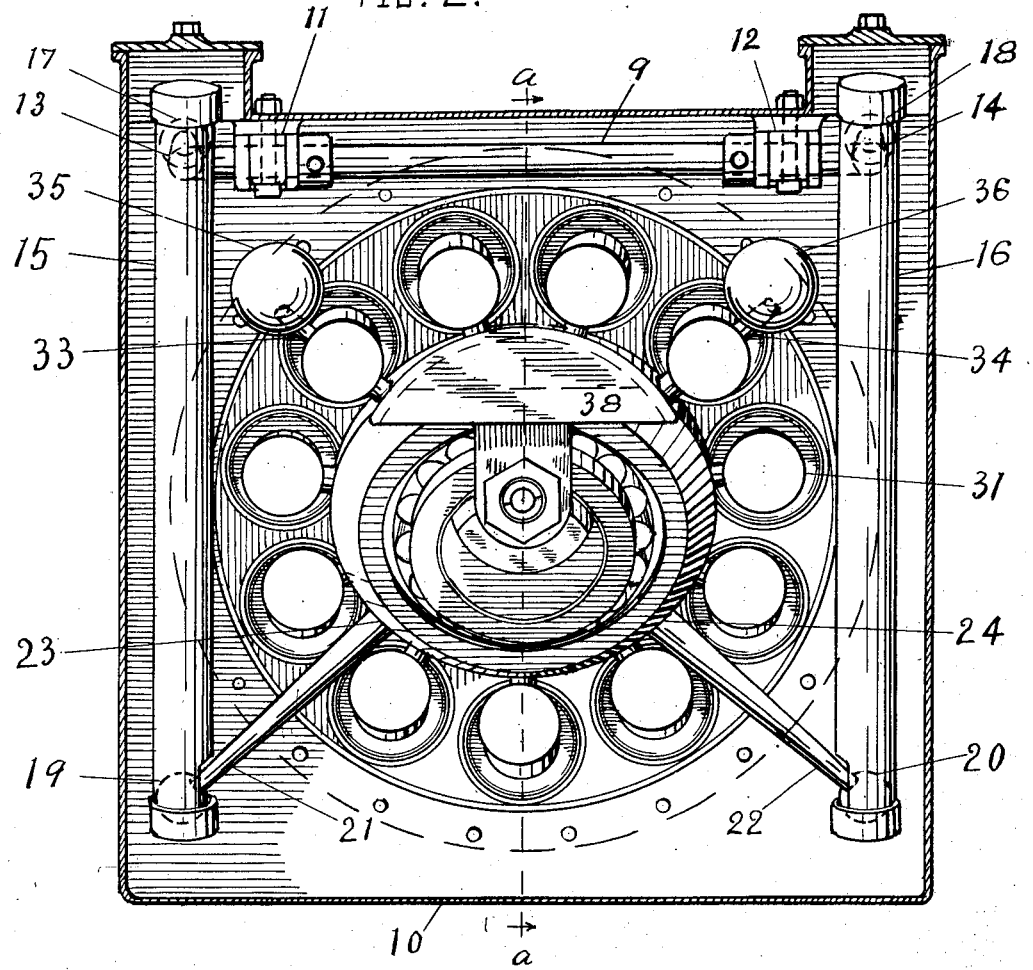

Patented July 28, 1931

1,816,274

UNITED STATES PATENT OFFICE

MELVIN ALBERT YEAKLEY, OF CANTON, OHIO

WABBLER HOLDING MECHANISM

Application filed October 3, 1929, Serial No. 397,138. Renewed June 17, 1931.

My invention relates to improvements in wabbler holding mechanism and pertains to that class where a wabbler is mounted to wabble on a rotative power shaft and is held from turning thereon by the wabbler holding mechanism, which anchors the wabbler to the frame of the apparatus.

The wabbler holding mechanism heretofore has been mostly of the well known ring holding types.

With that construction when running speedily the action of the wabbler is such that its action with its inertia of the mass of the wabbler, causes the whole apparatus to tremble. It has an untrue and vibratory trembling motion every half revolution of the power shaft, due to the holder ring holding the wabbler to wabble in a straight spherical path straight with the power shaft, (viewing it radially) at the holder ring and wabbler bearings. At other points around the wabbler on its spherical working path such as the connecting rod and wabbler ball joints are caused to wabble, in the form so as to describe an imaginary figure like that of a figure 8 viewing it radially on any one of these joints each figure increasing in width in proportion to the distance away from said straight spherical path, thus causing the power shaft to be once speeded and retarded by acting on the inertia of the wabbler every half revolution turned, causing an untrue torsion of the power shaft, and a trembling of the entire device.

The invention is shown and described herein as being used in an internal combustion engine which is one of its best uses, but it is applicable to pumps and the like as well.

The object of the invention is to provide a simple and practical wabble holding mechanism that will hold the wabbler to the frame, to wabble uniformly throughout its working cycle, whereby a trembling of the apparatus is eliminated, and a true torsion is delivered from the wabbler to the power shaft, at all times and parts of the working cycle when running, also including balancing elements that balance the holder rods and parts therewith so that the same can be counter-balanced by the main cross force counterbalance.

I attain these results with the hereinafter described mechanism.

In the accompanying drawings Fig. 1 is a sectional elevation of the engine having the cylinder head and parts therewith removed, and of Fig. 2 at dotted line a—a, looking in the direction of the arrows; Fig. 2 is a transverse view with the wabbler case sectioned away on dotted line b—b looking in the direction of the arrows of Fig. 1: Fig. 3 shows an imaginary figure that the wabbler and connecting rod ball joint describes when the engine is running.

Referring to the drawings in detail in which like reference numerals designate similar parts.

The power shaft 1 is mounted rotatively in suitable bearings 2 and 3 supported in the cylinder block 4. The wabbler head 5 is mounted fixedly on the power shaft 1. The wabbler 6 is mounted freely with suitable bearings 7 and 8 on the wabbler head which have their axis at an angle to that of the power shaft 1, so that the power shaft 1 can rotate in it and cause the wabbler to wabble, but not to rotate.

The equalizer and go and come member 9 is mounted freely to the wabbler case or frame 10 in bearings 11 and 12 one near each end of the equalizer and go and come member 9. The wabbler case or frame 10 is fixed to the cylinder block 4. The equalizer and go and come member 9 has a pair of fixed arms 13 and 14 at its ends extending to the right as seen in Fig. 1. Holder rods 15 and 16 are connected at their top ends with ball joints 17 and 18 on the respective holder arms 13 and 14 and at their lower ends by the respective ball joints 19 and 20 on the respective outer ends of the holder studs 21 and 22. The inner ends of the holder studs 21 and 22 being fixed to the lower side of wabbler 6 at 23 and 24, 90° apart and extending outwards from the center of the wabbler 6 an equal predetermined length to the respective ball joints 19 and 20, which operate in a spherical working path.

By the use of the combined equalizer and come and go member 9 and the holder rods 15 and 16 connected up with the wabbler 6 and frame 10 in this manner, it is seen that the wabbler 6 can wabble freely and is held to the frame 10 from rotating thereby.

In this instance there are eleven cylinders 27 in the cylinder block 4 in which pistons 28 operate. To each piston 28 is fixed a piston stud 29 which supports the ball joint 30 that connects the piston 28 and one end of the connecting rod 31. The wabbler studs 32, 33 and 34 are fixed to the wabbler 6 and extend radially outwards therefrom a determined length to and supporting the ball joints 25 that connects the other end of the connecting rod 31. Studs 33 and 34 in this instance extend outwardly past the ball joint 25 and support respectively balancing weight masses 35 and 36—90 degrees apart and each 90 degrees from the respective holder studs 21 and 22 surrounding the wabbler and around its axis, for balancing ball joints 19 and 20 and their associated parts so that those parts and balance weight masses 35 and 36 can be counter-balanced with counter-balance weight mass 37 and 38 which are fixed to the power shaft, one at each side of it and on each side of the wabbler a predetermined distance therefrom so that they will cause a cross force on the power shaft, in the direction as indicated by the arrows, which opposes the cross force set up by the wabbler and parts that move with it in the direction as indicated by the arrows, when running in either direction of the power shaft.

By the use of the equalizing member 9, these holder rods 15 and 16, connected up with the wabbler 6 in this manner, it is seen that the wabbler 6 can wabble freely and uniformly and is held to the wabbler case or frame 10 from rotating thereby, and holds the wabbler in such a manner (proven by a working model) that causes all of the ball joints 25 that work in a spherical path in their movement to describe in said spherical path an imaginery figure like that of a figure 8 shown at 26 Fig. 3, thus showing a uniform wabble throughout its working cycle, which causes it to work smoothly, and not produce a trembling motion when running speedily each half cycle, as does the ordinary type of ring wabbler holders.

It may be noted that the length of the holder rods 15 and 16 respectively from one ball joint 19 and 20 to the other 17 and 18 are equal to the distance from one ball joint 17 to the other 18 on the holder studs 21 and 22, also the distance from one holder arm ball joint 17 of the equalizing member 9, to the other 18 is the same as the distance from the holder stud ball joint 19 to the other 20. This causes the uniform working of the wabbler, and uniformly described imaginary figure like that of a figure 8 of the several ball joints 25.

It is seen that all of the ball joints 17, 18, 19 and 20 necessarily work approximately in the same spherical path surrounding the wabbler, having a radius from either ball joint 19 or 20 to the center of the wabbler, and each approximately 90 degrees apart in said spherical path.

It shall be noted that the term wabbler, means the wabbler proper and all parts fixed to it.

It shall be understood that the phrases "spherical path", means a way in any direction that parts may pass, a certain radius from a spherical center.

The necessary use of the equalizing and go and come member 9 is to allow a simultaneous go and come of the upper ends of the holder rods at ball joints 17 and 18 every time the wabbler makes a half working cycle, and the pull on one holder rod and push on the other, by the wabbler, is equal to each other at all times when the power shaft is working in either direction.

The device is not shown supported, but may be supported in any suitable manner.

It shall be understood that the term equalizing member includes all parts fixed to the equalizing and go and come member 9.

What I claim is:

1. In mechanism for flexibly holding a wabbler to the frame, the combination of a frame, a wabler mounted operatively in said frame, wabbler holding means flexibly connecting said frame and wabbler at two different points 90 degrees apart on the wabbler.

2. In mechanism of the character described, the combination of a freely mounted equalizing member, a wabbley mounted wabbler, a pair of holder rods flexibly connecting said equalizing member and wabbler.

3. In mechanism for flexibly holding a wabbler to a frame, the combination of a power shaft mounted freely in the frame, a wabbler mounted free to wabble on said power shaft, an equalizing member mounted freely in the frame, a pair of holder rods flexibly connecting said equalizing member and wabbler.

4. In mechanism for holding a wabbler to the frame, the combination of an equalizing member freely mounted in the frame, a wabbler mounted free to wabble in the frame, wabbler holding means flexibly connecting said wabbler and equalizing member.

5. In mechanism for holding a wabbler to the frame, the combination of a mounted wabbler, a mounted equalizing member, a pair of holding means flexibly connecting said wabbler and equalizing member.

6. In mechanism for flexibly holding a wabbler to the frame, the combination of a frame, a power shaft mounted rotatively in said frame, a wabbler mounted free to wabble on said power shaft, an equalizing and go and come member mounted freely in said frame, a pair of holder rods respectively connecting said wabbler and equalizing and go and come member.

7. In mechanism of the class described, the combination of a wabbler mounted free to wabble and having a holder spherical path, a freely mounted equalizing and go and come member having a pair of holder arms with the holder ends approximately extending in said holder spherical path, a pair of holder rods each having one end connecting the respective holder arms and the other end connecting said wabbler 90 degrees apart in said spherical path.

8. In mechanism of the class described, the combination of a wabbler mounted free to wabble and having a holder spherical path, a freely mounted equalizing member having a pair of holder connections extending in said spherical path and approximately 90 degrees apart therein, a pair of holder rods each connecting at one end said respective holder connections and the other end said wabbler at respective points in said holder spherical path 90 degrees apart and approximately 90 degrees from said respective holder connections.

9. In mechanism of the class described, the combination of a frame, a power shaft mounted rotatively in said frame, a wabbler mounted to wabble on said power shaft having pistons connected therewith, a pair of wabbler holding means connecting said frame and wabbler and 90 degrees apart on the wabbler, a pair of balancing weight masses operative with said wabbler 90 degrees apart and each 90 degrees from said wabbler holding means on the wabbler for balancing said wabbler holding means, a pair of counter-balance weight masses fixed on the power shaft one on each opposite side thereof and at each side of said wabbler and arranged to cause a cross force on said power shaft to oppose the cross force set up by said wabbler, pistons, wabbler holder means and balancing weight masses, when running.

In testimony whereof, I hereunto affix my signature.

MELVIN ALBERT YEAKLEY.